United States Patent [19]
Billieres

[11] Patent Number: 5,935,354
[45] Date of Patent: Aug. 10, 1999

[54] TIRE HAVING REINFORCEMENT PLY WITH DISCONTINUOUS SUBSTANTIALLY CIRCUMFERENTIAL METAL WIRES OR CABLES

[75] Inventor: Jean Billieres, Clermont-Ferrand, France

[73] Assignee: Compagnie Generale des Etablissements Michelin - Michelin & Cie, Clermont-Ferrand Cedex, France

[21] Appl. No.: 08/952,889

[22] PCT Filed: May 10, 1996

[86] PCT No.: PCT/EP96/02011

§ 371 Date: Nov. 26, 1997

§ 102(e) Date: Nov. 26, 1997

[87] PCT Pub. No.: WO96/38312

PCT Pub. Date: Dec. 5, 1996

[30] Foreign Application Priority Data

May 30, 1995 [FR] France .................... 95 06504

[51] Int. Cl.⁶ ............... B60C 9/00; B60C 9/18; B60C 9/20; B60C 9/22
[52] U.S. Cl. ............ 152/527; 152/451; 152/531; 152/533; 152/536; 152/537; 152/565
[58] Field of Search .................. 152/451, 526, 152/527, 530, 531, 533, 536, 555, 537, 565

[56] References Cited

U.S. PATENT DOCUMENTS

| 3,077,915 | 2/1963 | Weber | 152/555 X |
|---|---|---|---|
| 3,095,026 | 6/1963 | Weber | 152/527 X |
| 3,095,027 | 6/1963 | Weber | 152/527 X |
| 3,570,574 | 3/1971 | Boustany et al. | 152/531 X |
| 3,802,478 | 4/1974 | Boustany et al. | 152/527 |
| 3,990,493 | 11/1976 | Caretta | 152/527 X |
| 4,363,346 | 12/1982 | Pepe | 152/536 X |
| 4,791,973 | 12/1988 | Davisson | 152/531 X |
| 5,529,104 | 6/1996 | Ddelias et al. | 152/555 X |
| 5,783,003 | 7/1998 | Lescoffit | 152/527 X |

FOREIGN PATENT DOCUMENTS

| 1085781 | 7/1960 | Germany | 152/526 |
|---|---|---|---|
| 1091890 | 10/1960 | Germany | 152/531 |
| 62-152833 | 7/1987 | Japan | 152/527 |
| 62-152834 | 7/1987 | Japan | 152/527 |
| 62-231802 | 10/1987 | Japan | 152/531 |
| 62-273837 | 11/1987 | Japan | 152/527 |
| 63-106104 | 5/1988 | Japan | 152/531 |

*Primary Examiner*—Adrienne C. Johnstone
*Attorney, Agent, or Firm*—Baker & Botts, L.L.P.

[57] ABSTRACT

A tire, having at least one carcass reinforcement, furthermore comprises additional reinforcement ply (1) of maximum circumferential length L, composed at least of lengths (20) of metal wires or cables, of lengths of between 0.1 L and 0.5 L, arranged substantially circumferentially, parallel to each other and forming rows separated from each other, in the direction perpendicular to their orientation, by gaps (p, P), characterized in that a textile cord or cable (3) of synthetic material is present in at least one gap out of two, and continuous over the entire length of the rows.

5 Claims, 2 Drawing Sheets

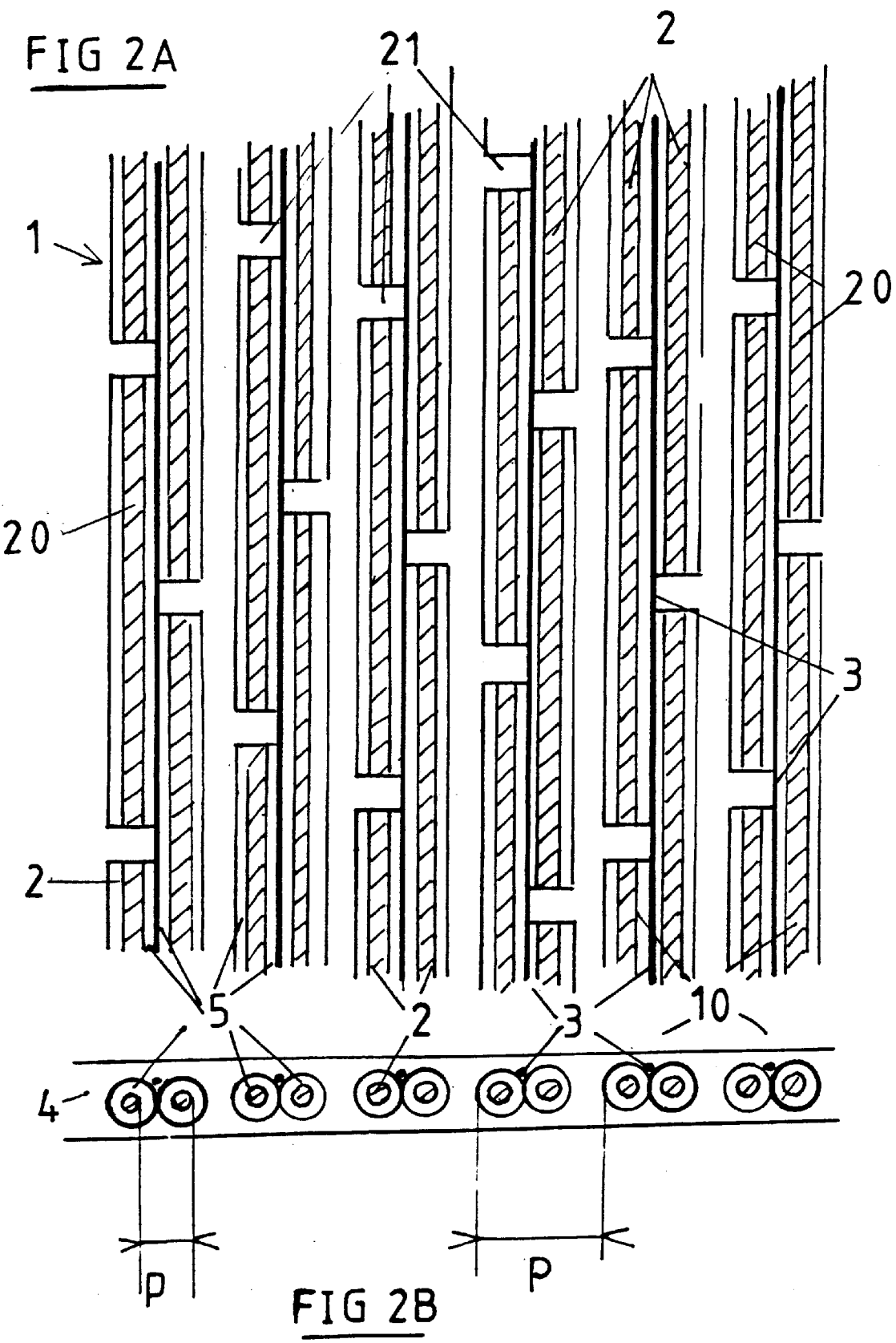

TIRE HAVING REINFORCEMENT PLY WITH DISCONTINUOUS SUBSTANTIALLY CIRCUMFERENTIAL METAL WIRES OR CABLES

BACKGROUND OF THE INVENTION

The present invention relates to a tire with radial carcass reinforcement furthermore comprising a reinforcement formed of at least one ply of reinforcement elements which is composed of wires or cables forming an angle of between 0° and 15° with the circumferential direction of said tire. It also relates to the method of production of said ply from a strip of wires and/or cables.

In the case of a tire for a passenger vehicle, the ply or plies of circumferential elements are generally crown reinforcement plies of continuous polyamide cables, and in particular aliphatic polyamide, these cables permitting a certain elasticity while permitting, owing to their property of contractility under the action of heat, major hooping of the subjacent plies, which are generally of metal and formed of cables forming a certain angle, generally between 10° and 45°, with the circumferential direction.

This type of textile cable is not recommended for use in large quantities in crown reinforcements for "heavy-goods vehicle" tires, in particular for so-called highway tires. In fact, the afore-mentioned material gives rise to heating, which is incompatible with a long life of the crown of the tire. The use of metal cables is preferable, because firstly it results in a lower production of heat in the zones subject to heating, and secondly results in better dissipation of the heat produced.

The use of substantially circumferential metal cables in a crown reinforcement ply for a "heavy-goods vehicle" tire is not without its problems, in particular in the molding of the tire in the vulcanization mold. Good distribution of the rubber mix of the tread when the curing press is closed and vulcanization begins requires the tire, in the non-vulcanized state, to have a tread diameter, measured in the equatorial plane, which is slightly less than the diameter, measured under the same conditions, which it has to have in the vulcanization mold, and to be subjected to what is customarily called additional shaping in the vulcanization mold. A crown reinforcement for a tire with radial carcass reinforcement, comprising one or more plies of continuous, inextensible metal cables (that is to say those having an elongation of less than 0.2% under a tensile force equal to 10% of the breaking load), makes said additional shaping under low tension possible only with great difficulty or not at all.

The use, as described for example in patent FR 2 013 812, of inextensible metal cables which are discontinuous over a circumferential length has then proved judicious, firstly because it permits sufficient elasticity of the ply in the non-vulcanized state, and secondly because it permits the obtention in the vulcanized state of a modulus of elasticity in tension of the ply which is very largely sufficient, said modulus being obtained by judicious selection of the length, whether variable or not, of the cut cables and by the circumferential offset of the cuts.

The elasticity of the non-vulcanized ply is not only sufficient but too great for ready handling during production of the tire, and has proved to be the cause of laying irregularities, and in particular irregularities in the diameters of crown reinforcements for the various tires of one and the same series.

It is obvious that the problem occurs in the same way with any reinforcement which comprises metal cables, the lengths of which are less than the circumferential lengths of the parallel ones occupied in the tire, insofar as it has been prepared independently of the building drum and/or shaping drum for the non-vulcanized blanks of tire carcass reinforcements, without however inevitably having the same consequences.

SUMMARY OF THE INVENTION

With the aim of overcoming such production-related disadvantages, whilst not adversely affecting the performance of the tire during travel, the invention proposes a tire with carcass reinforcement, furthermore comprising at least one additional reinforcement ply of maximum circumferential length L, composed at least of lengths of metal wires or cables, of lengths of between 0.1 L and 0.5 L, arranged substantially circumferentially, parallel to each other and forming rows separated from each other, in the direction perpendicular to their orientation, by gaps, characterized in that a textile cord or cable of synthetic material is present in at least one gap out of two, and continuous over the entire length of the rows.

"Length L of a reinforcement ply" for a tire is to be understood to mean the maximum circumferential length of said ply.

The invention is particularly advantageous when the additional reinforcement ply is a crown reinforcement ply of circumferential cables, that is to say of cables forming an angle within the range ±2.5° with the circumferential direction of the tire.

"Cables arranged substantially circumferentially" are understood to mean cables forming angles of between 0° and 15° with the circumferential direction of the tire.

Advantageously, the textile cord or cable is a cord or cable of low diameter, at most equal to 0.2 times the diameter of the metal cables of the ply, taking into account the fact that the breaking load of said cord or cable will be at least equal to the tension to which the cord or cable has to be subjected in the non-vulcanized blank of the tire under the action of the cambering pressure used for the shaping of said blank, and at most equal to 5 times said value, which permits the rupture of said textile cords or cables of the ply during the vulcanization of the tire.

"Synthetic textile cord or cable" is to be understood to mean a cord or cable of rayon and/or of polyamide and/or of polyester and/or of any other synthetic plastics material capable of being used for the production of textile fibers. Said textile cord or cable may be able to be contracted under the action of heat, and will have as low as possible a relative elongation under the action of the tension induced by the shaping pressure.

The production of a reinforcement ply with elements which are discontinuous in the direction of the cords or cables may be effected in various ways. One first way consists in producing a ply of continuous cords or cables according to one of the perfectly known methods, and to cut the cords or cables of the calendered ply thus formed into pieces at intervals, regular or not, spaced apart longitudinally. In order to cut the reinforcement elements, manual cutting tools, or automatic cutting tools, for example such as described in U.S. Pat. No. 3,844,327, may be used. This first method, which is already poorly suited to cutting cable by cable in the event that only metal cables are present, is absolutely unsuited in the event that textile cords or cables, which are at great risk of being cut in risky manner as well, are present between the rows of metal cables. A second method of producing the ply of discontinuous cables consists in laying, with slight pressure on a layer of non-vulcanized rubber mix which has previously been placed on a cylindrical drum or on a table, sections of precut cord, or cables, said laying being effected in accordance with a layout arranged taking into account the length of the lengths (which may be variable or constant), the distance between ends of the lengths in the longitudinal direction of the ply, the axial distance between lengths, which may also be variable or non-variable, For the production of the ply according to the present invention, the continuous textile cord or cable which is unwound from a supply reel, can be laid simultaneously. The lengths and the cord or cable having been laid, the ply is finished by depositing a second layer of non-vulcanized rubber mix on the lengths. In order to operate this second method, the lengths of hooped cables may be used in the bare state and the textile cord or cable will be laid between the rows of lengths such that it is not in contact with said lengths, which requires great laying accuracy and results in a lengthy and costly method. It is advantageous to use lengths of coated cables, that is to say cables around which a cylindrical sleeve of rubber mix has already been laid by appropriate means, such as, for example, extrusion in which the rubber mix, emerging from a suitable die, is laid around the cord emerging through a guide orifice. Whilst it is preferable for hooped cables, the use of coated cables is virtually compulsory for non-hooped cables.

Such a use, combined with the presence of an inserted textile cord or cable between two rows of lengths of metal cables, advantageously permits the production of a tire comprising a reinforcement ply with discontinuous circumferential cables, that is to say, cables which form angles within the range of ±5° with the direction of the tire. The method for producing such a ply consists in:

producing a strip composed of at least two contiguous rows of coated, discontinuous metal cables and, between each row, a sized continuous textile cord or cable, laying said strip on an inserted band of non-stick material, for example polyethylene, of a width substantially equal to twice the width of the strip of cables, and winding the complex thus formed on a winding reel, unwinding the strip in order to wind it in a coil around a cylindrical drum or around a blank of carcass and/or crown reinforcements.

DESCRIPTION OF THE DRAWINGS

The characteristics and advantages of the invention will be better understood with reference to the following description, which refers to the drawing illustrating examples of embodiment in non-limitative fashion, in which:

FIGS. 2A and 2B show, in the same manner, a reinforcement ply according to a second variant of the invention.

DESCRIPTION OF PREFERRED EMBODIMENTS

Figures 1A, 1B:
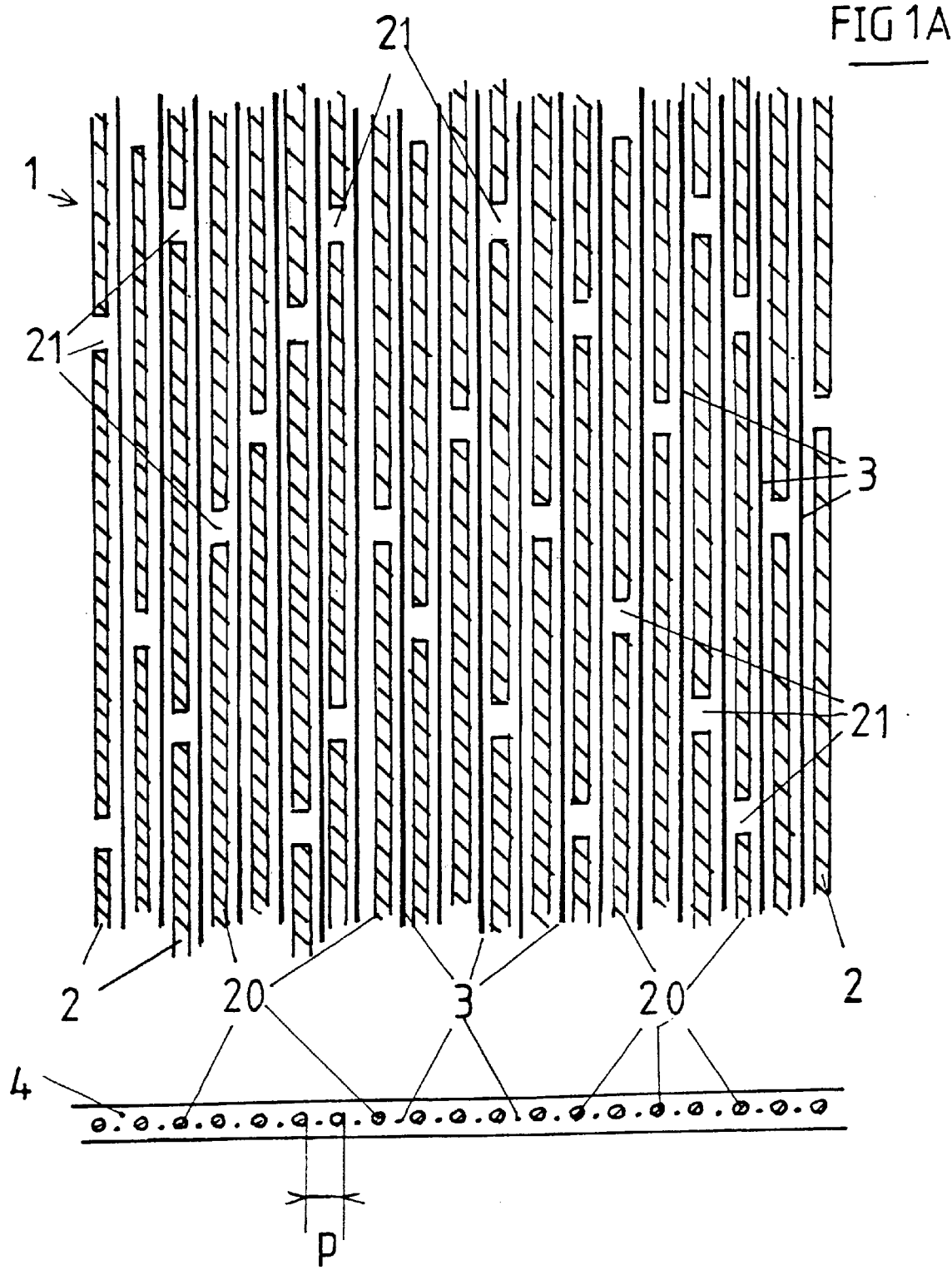
FIGS. 1A and 1B show diagrammatically, a reinforcement ply according to a first variant of the invention, viewed respectively in plan view and in meridian section.

The reinforcement ply 1, which is intended to be a crown reinforcement ply, the reinforcement elements 2, 3 of which will be oriented circumferentially, is formed, firstly, of lengths 20 of hooped metal 27.23 FR cables, said lengths 20 all being of the same length, and being separated circumferentially from each other by cuts 21. A row 2 of lengths 20 is axially separated from the axially adjacent row by a gap or pitch p, and in the case illustrated said pitch is axially constant (the pitch being the axial distance between the same two generatrices, respectively of two adjacent cables). These hooped cables are used in the bare state and, after unwinding from one or more supply reel(s), pass over a conveyor, being guided by combs, to arrive in front of a set of cutting heads which, in accordance with a predetermined program, make the cuts 21 as desired. Starting from one or more other reel(s), one or more sized cord(s) 3 of aliphatic polyamide, that is to say cords coated with a composition based on rubber latex, resorcinol and formaldehyde, is (are) guided by suitable means so as to be arranged in all the gaps existing between the rows of metallic lengths 20. The two series, respectively of metallic lengths 20 and of textile cords 3, are inserted, as is known, between two layers of non-vulcanized rubber mix, said two layers becoming the liner 4 of the ply 1 thus formed. As the textile cords 3 have a diameter d of 0.25 mm in the case in question, it is preferable for the pitch p between two rows 2 of metallic lengths 20 to be at least 1.9 mm, so as to avoid any possible contact between the sized textile cord 3 and the lengths 20 adjacent thereto.

FIG. 2 shows a reinforcement ply 1 formed from a strip 10 composed of two rows 2 of metallic lengths 20 of non-hooped 27.23 cables, coated with a sheath 5 of non-vulcanized rubber mix, said coated lengths 20 being axially contiguous, and from a sized rayon textile cord, laid between and on the two rows of metallic lengths 20. The production of such a strip comprises the following stages: two non-hooped metal cables are coated with the non-vulcanized rubber sheath by known extrusion means, and are then cut to the desired lengths. The lengths 20 thus obtained are then guided by suitable means until they become contiguous, and the cord of sized rayon 3 is then deposited with slight vertical pressure on this assembly of two rows 2 of lengths 20. The strip 10, thus formed on a band of polyethylene, of a width equal to twice the diameter of a coated cable, is wound on a supply reel as a metal or textile cable is usually wound, with a winding gap between the turns of the winding. The conventional known means can be used for the formation of the reinforcement ply 1: the strip 10 can be wound in a spiral around a winding form, which may be a drum which is cylindrical or bulges slightly transversely, on which a first layer of non-vulcanized rubber will previously have been deposited; thus it is possible also to wind the strip 10 directly around the non-vulcanized blank of the carcass reinforcement of the tire to be manufactured, or the carcass reinforcement/crown plies assembly of said tire, as a function of the desired radial positioning of the reinforcement ply 1 with circumferential elements. A second layer of mix completes the reinforcement ply 1, and will form the liner 4 of the ply 1. It is obvious that the strip 10 can be produced from a number of rows 2 of lengths 20 greater than 2, without however reasonably exceeding the number of 5.

This principle of the formation of the reinforcement ply 1 offers the advantage being able to use a rubber mix 5 which, after vulcanization, has properties of moduli, hysteresis loss, bonding etc. which are different from those of the calendering mix 4: in the case described, the mix 5 is a mix which adheres strongly to the metal cables, with a high tangent modulus of tension under 10% relative elongation, whereas the calendering mix 4 is a mix which adheres strongly to the size used on the textile cords and with a tangent modulus of tension, measured under the same conditions, which is far less high. It is obvious that the strip 10 can be laid with a pitch P which is different from the theoretical pitch p which exists between the two rows of lengths (theoretical because it is estimated between the generatrices of the metallic parts of the coated cables), and that various variant embodiments can be provided, as can numerous structural variants of the reinforcement ply 1.

I claim:

1. A tire having carcass reinforcement, furthermore comprising at least one additional reinforcement ply (1) of maximum circumferential length L, composed at least of lengths (20) of metal wires or cables, of lengths of between 0.1 L and 0.5 L, arranged substantially circumferentially, parallel to each other and forming rows separated from each other, in the direction perpendicular to their orientation, by gaps (p, P), wherein a synthetic textile cord or cable (3) continuous over the entire length of the rows is present in at least one gap out of two.

2. A tire according to claim 1, wherein the at least one additional reinforcement ply (1) is a crown reinforcement ply and the lengths (20) of metal wires or cables arranged substantially circumferentially are lengths of circumferential metal cables.

3. A tire according to claim 1, wherein the textile cord or cable (3) is a cord or cable of low diameter, at most equal to 0.2 times the diameter of the metal wires or cables of the at least one additional reinforcement ply (1).

4. A tire according to claim 3, wherein the breaking load of the textile cord or cable (3) is a least equal to the tension to which the cord or cable is to be subjected in a nonvalcanized blank of the tire under the action of the cambering pressure to be used for shaping of said blank, and at most equal to 5 times said tension.

5. A tire according to claim 1, wherein the lengths (20) of metal wires or cables arranged substantially circumferentially are lengths of circumferential metal cables, the synthetic textile cord or cable (3) is a sized rayon textile cord, and the at least one additional reinforcement ply (1) is formed from a strip (10) composed of two axially contiguous rows of said lengths of metal cables coated with a sheath (5) of rubber mix, said rayon cord laid between and on said two rows of lengths of metal cables, and a liner (4) of rubber mix, said strip being spirally wound with a gap (P) greater than the gap (p) existing between said two rows of lengths of metal cables.

* * * * *